(12) United States Patent
Ootsuka

(10) Patent No.: US 6,688,820 B2
(45) Date of Patent: Feb. 10, 2004

(54) CARGO BED STRUCTURE OF TRUCK

(75) Inventor: Tomonori Ootsuka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/154,510

(22) Filed: May 23, 2002

(65) Prior Publication Data

US 2002/0180239 A1 Dec. 5, 2002

(30) Foreign Application Priority Data

May 29, 2001 (JP) ......................................... 2001-161062

(51) Int. Cl.[7] .................................................. B60P 7/08
(52) U.S. Cl. .......................................... 410/77; 410/89
(58) Field of Search ............................. 410/77, 78, 89, 410/34; 248/500, 503

(56) References Cited

U.S. PATENT DOCUMENTS

| | | | | |
|---|---|---|---|---|
| 3,116,702 A | * | 1/1964 | Stough | 410/89 |
| 3,282,550 A | * | 11/1966 | Warren | 410/77 |
| 5,000,635 A | * | 3/1991 | Jensen et al. | 410/86 |
| 5,362,184 A | * | 11/1994 | Hull et al. | 410/90 |
| 5,957,640 A | * | 9/1999 | Schmieke et al. | 410/80 |
| 6,039,519 A | * | 3/2000 | Jones et al. | 410/69 |
| 6,315,508 B1 | * | 11/2001 | Nadon | 410/80 |
| 6,485,239 B2 | * | 11/2002 | Afful | 410/80 |

FOREIGN PATENT DOCUMENTS

JP 55-135671 9/1980

* cited by examiner

*Primary Examiner*—Stephen T. Gordon
(74) *Attorney, Agent, or Firm*—Darby & Darby

(57) ABSTRACT

A cargo bed structure of a truck has concave portions formed within an inside surface of each right and left side wall for detachably mounting long materials on a lower surface of the concave portion, respectively. The bed structure includes a rotational member, an end side of which is supported rotatably by a surface of the side wall formed over the concave portion. The rotational member regulates a movement of the long materials in a vertical direction with the other end of the rotational member when the rotational member rotates in one direction, and deregulates the movement of the long materials when the rotational member rotates in the other direction.

7 Claims, 13 Drawing Sheets

CARGO BED STRUCTURE OF TRUCK

BACKGROUND OF THE INVENTION

The present invention relates to a cargo bed structure of a truck for carrying many long materials therein, particularly to the bed structure with a mounting and fixing apparatus of the long materials.

As the cargo bed structure of the truck, for example, one as described in the Japanese Utility Model Application Laid Open No. 55-135671 is well known. Disclosed is the cargo bed structure which has scantlings as the materials, each end of which is installed in right and left side walls. The scantlings are mounted detachably on each lower surface of concave portions which are formed on each inside surface of the right and left side walls facing with each other.

A plate member is mounted on the scantlings, thereby dividing a space formed by each side wall of the cargo bed in a vertical direction. That is, such a structure allows cargo to be mounted on a floor, and also on the plate member.

However, there occurs any problems as follows in the conventional cargo bed structure of the truck. Namely, suppose a case that a shock is exerted on the scantlings at acceleration/deceleration or turning conditions, or because of a rough road surface when the cargo mounted on the plate member provided upon the scantlings are light in weight. In such a case, the scantlings are shaked in the concave portion, so that a creak may occur. In the case that a large shock is exerted over the truck, there may occur a problem that the scantling is out of the concave portion.

SUMMARY OF THE INVENTION

An object of the present invention is to provide a cargo bed structure of a truck which can firmly secure long materials into concave portions.

In order to achieve the above mentioned object, according to a first aspect of the present invention, there is provided the cargo bed structure of the truck having the concave portions formed within an inside surface of each right and left side wall for detachably mounting long materials on a lower surface of the concave portion, respectively, comprising a rotational member, an end of which is rotatably supported by a surface of the side wall formed over the concave portion, wherein the rotational member regulates a movement of the long materials in a vertical direction with an other end of the rotational member when the rotational member rotates in one direction, and deregulates the movement of the long materials when the rotational member rotates in the other direction.

According to the first aspect of the present invention, when the long material is mounted on the lower surface of each concave portion, each rotational member is rotated in an outside direction of the bed, so that the long materials can be installed in the concave portion. After installing the long materials into the concave portion, each rotational member is rotated in an inside direction of the bed, so that the long materials can be fixed under a situation that the movement of the long materials in the vertical direction is regulated by the other end of each rotational member. Further, when removing the long materials from each concave portion, each rotational member is rotated in the outside direction, thereby deregulating the movement of the long materials, and then the long materials can be removed from each concave portion.

Therefore, since the long materials can be mounted or removed through rotating each rotational member, the operation can be easily performed, and also the long materials can be firmly fixed in the concave portion. Even if, therefore, a shock is exerted on the scantlings at acceleration/deceleration or turning conditions, or because of a rough road surface when the cargo mounted on the plate member provided upon the scantlings are light in weight, the scantlings do not become shaky in the concave portion, so that there is no possibility that a creak occurs. Even if a large shock is exerted over the truck, there is no possibility also that the scantling becomes out of the concave portion.

A second aspect of the present invention is characterized in that, in the cargo bed structure of the truck according to the first aspect of the present invention, a hanging portion 8d, 81c, 82c is formed with a flange at the other end of the rotational member as shown, for example, in FIGS. 5, 7 and 9.

According to the second aspect of the present invention, articles such as a vinyl bag can be held on the hanging portion 8d, 81c and 82c when the long material is not mounted in the concave portion. Therefore, the convenience can be increased in practice.

A third aspect of the present invention is characterized in that, in the cargo bed structure of truck according to the second aspect of the present invention, the other end of each rotational member includes a first other end portion, and a second other end portion located at an upper position from the first other end portion. The first other end portion regulates the movement of the long materials in the vertical direction, and the second other end portion is provided with the hanging portion as shown, for example, in FIGS. 7 and 9.

According to the third aspect of the present invention, even if the first other end portion operates to regulate the movement of the long materials in the vertical direction, the hanging portion of the second other end portion can hold the articles such as the vinyl bag. Therefore, irrespective of an existence or non-existence of the long materials, the articles can be held on the bed.

A fourth aspect of the present invention is characterized in that a right and left regulating portion is provided on the other end of each rotational member to regulate a movement of the long materials in the right and left direction when the rotational member rotates in the one direction for regulating the movement of the long materials in the vertical direction as shown in, for example, FIG. 9.

According to the fourth aspect of the present invention, the movement of the long materials in the right and left direction also is regulated as well as the vertical direction under the situation that the long material is installed in the concave portion. Thus, the long materials can further be firmly fixed onto the bed.

A fifth aspect of the present invention is characterized in that a pair of notches or eyelets are formed between the one end and the other end of rotational member as shown in, for example, FIG. 12.

According to the fifth aspect of the present invention, the string member such as a rope can be turned around a back of the rotational member 8, that is, the cargo mounted on the plate provided upon the scantling 7 can be firmly fixed by the rope, then resulting in an improvement of the bed structure.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
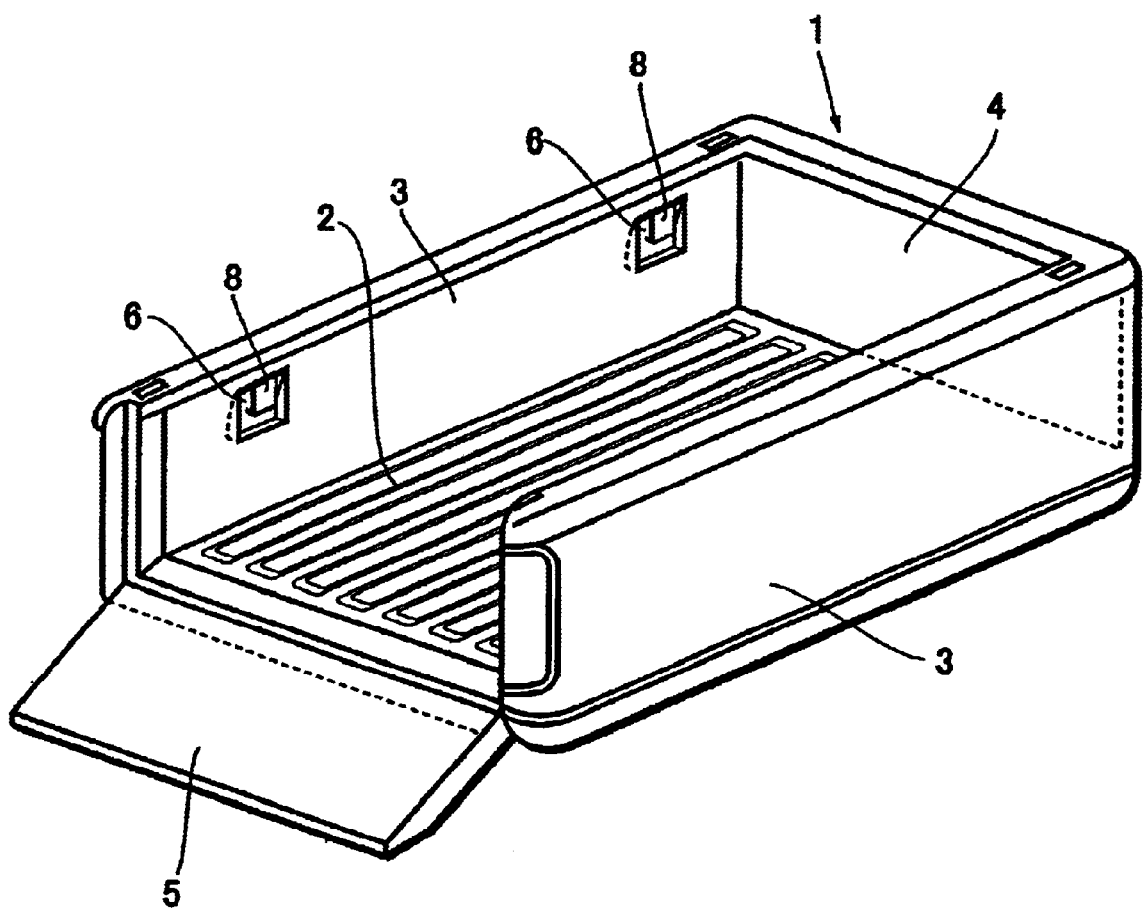
FIG. 1 is a schematic perspective view of a cargo bed of a truck showing the first embodiment of the present invention.

FIGS. 1–4 show the first embodiment of the present invention. FIG. 1 is a schematic perspective view of a cargo bed of a truck.

As shown in FIG. 1, the cargo bed structure of the truck is provided with a floor surface 2, right and left side walls 3 extending in an upward direction from the floor surface 2, a front side wall 4 and a rear side wall 5 of the cargo bed 1. The rear side wall 5 is pivotable upon a lower end thereof, and FIG. 1 shows the situation where the rear side wall 5 is pivoted in an outer side direction of the bed 1.

Figure 3:
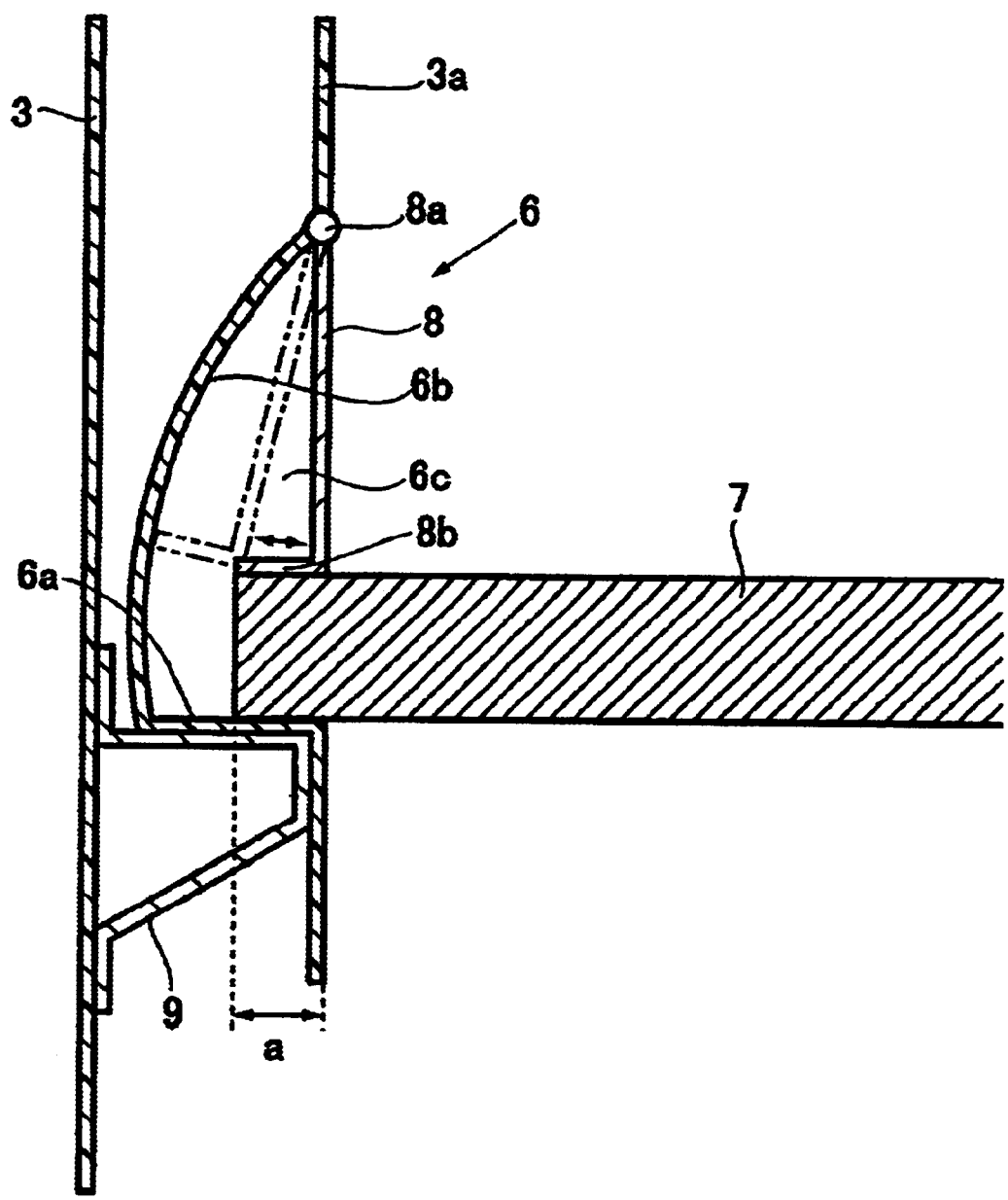
FIG. 3 is a partially sectional view of the cargo bed as seen from a back side of the truck showing the situation where an end of the scantling is installed into a concave portion formed in the side wall.

On each inner side surface 3a of the right and left side walls, two concave portions 6 are formed, respectively, which are arranged in a longitudinal direction thereof. As shown in FIG. 3, a scantling 7 as a long material is detachably installed on a lower surface 6a of each concave 6 facing with each other.

Figure 2:
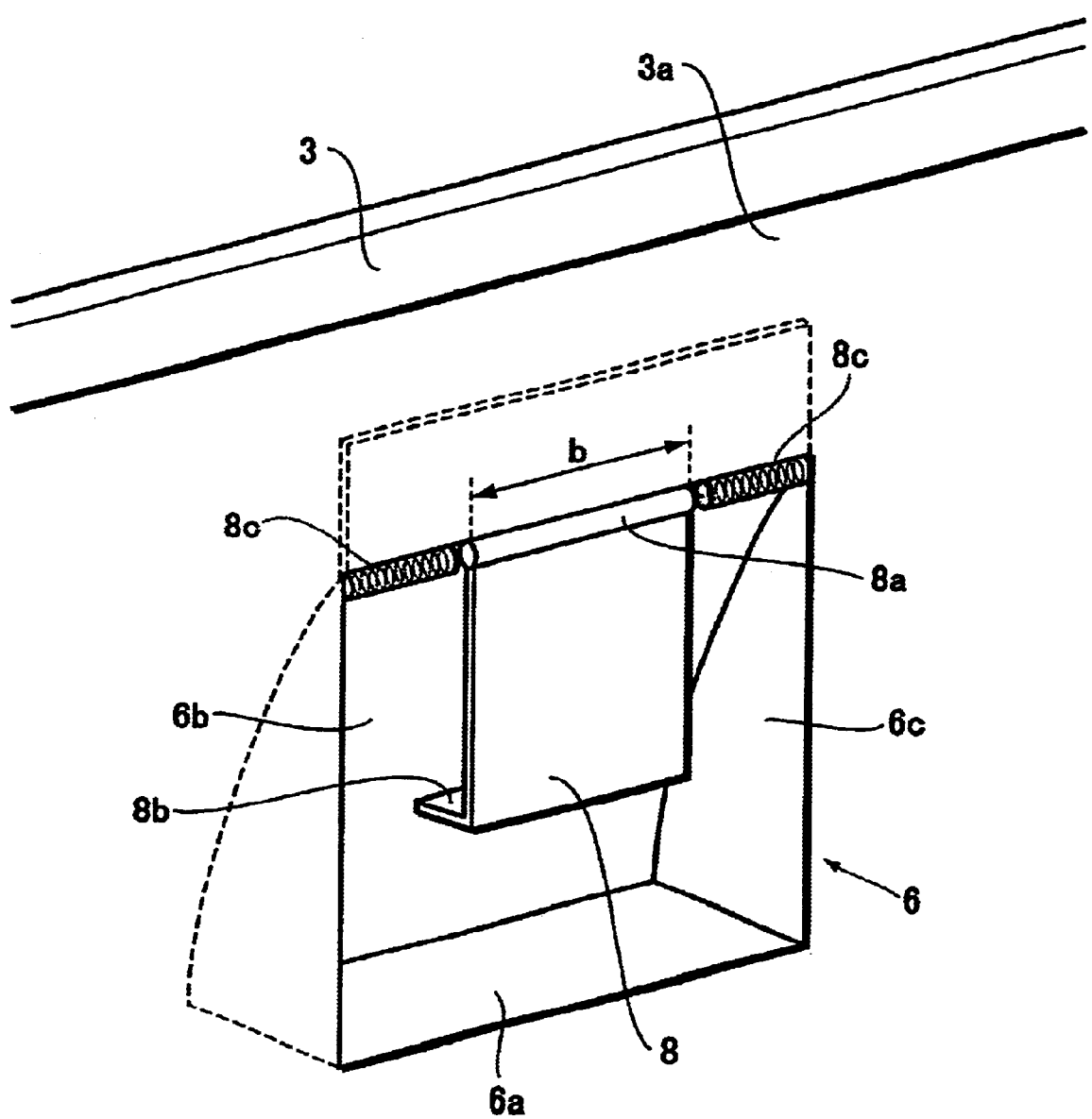
FIG. 2 is an enlarged perspective view of right and left side walls.

As shown in FIG. 2, each concave portion 6 is formed by the lower surface 6a substantially horizontally extending from the inner side surface 3a in a right and left outer direction, a curved surface 6b extending in a curved manner from the inner side surface 3a of an upper side of the lower surface 6a in the right and left outer direction, and front and rear side surfaces 6c. The lower surface 6a and the curved surface 6b are consecutively formed at a respective right and left outer end thereof with each other, the latter of which is curved in a right and left lower direction.

Figure 4:
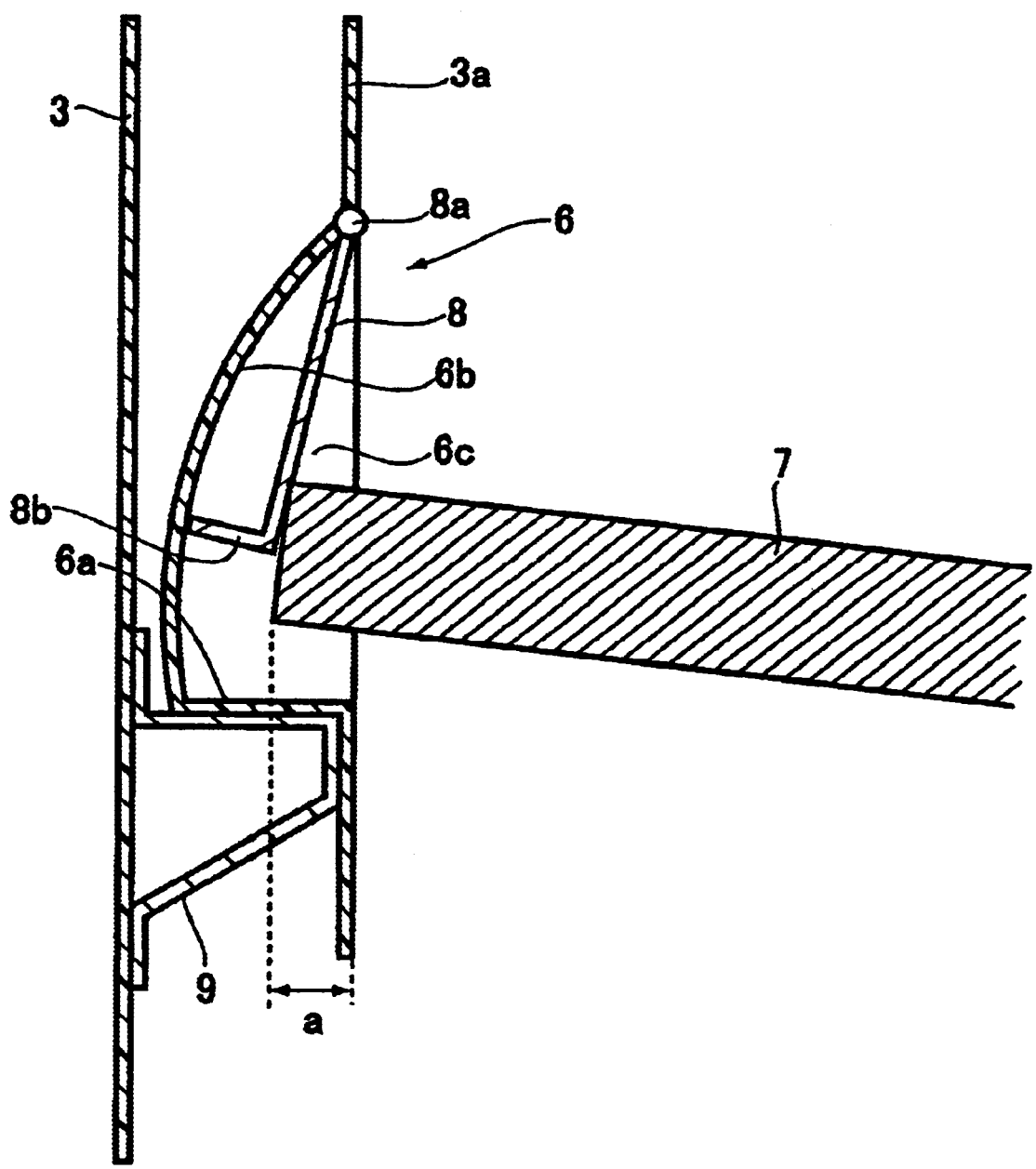
FIG. 4 is a partially sectional view of the cargo bed as seen from the back side of the truck showing the situation where a rotational member is rotated in a direction of outside.

A rotational member 8 is rotatably supported at an end portion which each curved surface 6b has at a side of the inner side surface 3a. Each rotational member 8 is formed like a plate, and comprises a hinge portion 8a provided at one end side thereof, a horizontal flange portion 8b provided at another end side, and springs 8c for forcing each rotational member in a right and left inner side direction, i.e., toward an inside of the cargo bed 1. That is, each hinge portion 8a is supported at the end portion which each curved surface 6b has at the side of the inner side surface 3a. Each rotational member 8 can rotate from a position where it extends straight and downward from the inner side surface 3a as shown in FIG. 3 to a position where it abuts on the curved surface 6b as shown in FIG. 4. Further, each horizontal flange portion 8b is formed by allowing the rotational member 8 to be bent substantially perpendicularly to the other end thereof in a right and left outside direction. As shown in FIG. 3, when an end of the scantling 7 is placed on the lower surface 6a of each concave portion 6 under a situation where the rotational member 8 extends straight and downward from the inner side surface 3a, the other end of each rotational member 8 abuts with an upper surface of the scantling 7, thereby regulating a movement of the scantling 7 in a vertical direction.

In addition, a bracket 9 is provided in the underside of each concave portion 6 within the right and left side walls. A part of each bracket 9 is fixed at an outer side surface of the right and left side wall 3, the other part thereof extending toward the inner side surface 3a. Accordingly, each bracket 9 supports the lower surface 6a of the concave portion 6.

Specifically, when mounting the end of the scantling 7 on the lower surface 6a of the concave portion 6, each rotational member 8 is rotated in the right and left outside direction as shown in FIG. 4, so that the scantling 7 slides along the rotational member 8 toward the lower surface 6a. After mounting the scantling 7 on each lower surface 6a, the rotational member 8 is rotated toward the inside of the cargo bed, thereby allowing the scantling 7 to be fixed within each concave portion 6 under the situation that the movement of vertical direction thereof is regulated by each rotational member 8.

More specifically, when the scantling 7 is mounted on each lower surface 6a, each rotational member 8 is moved toward the curved surface 6b. Therefore, as shown in FIG. 4, the scantling 7 is mounted thereon sliding along an oblique surface of the rotational member 8 from an oblique and upper side against the lower surface 6a. In the present embodiment, each rotational member 8 is forced toward the inside of the bed 1 by a spring, thus the rotational member is once rotated in the outside direction against the force of spring through pressing the scantling 7 into the concave portion 6. After the scantling 7 is, however, mounted on each lower surface 6a, each rotational member 8 is forced toward the inside of the bed 1 by the spring. Consequently, the scantling 7 can be firmly fixed on the lower surface 6a.

Moreover, when removing the scantling 7 from each concave portion 6, each rotation member 8 is rotated toward the outside, thereby removing the regulation of movement of the scantling 7 performed by the rotation member 8 to remove the scantling 7 from each concave portion 6.

In such a way, according to the first embodiment of the present invention, the scantling 7 is fixed in the concave portion 6 under the situation that the movement of vertical direction is regulated. Even if, therefore, a shock is exerted on the scantlings 7 at acceleration/deceleration or turning conditions, or because of a rough road surface when the cargo mounted on the plate member provided upon the scantlings are light in weight, the scantlings do not become shaky in the concave portion, so that there is no possibility that a creak occurs. Even if a large shock is exerted over the truck, there is no possibility also that the scantling 7 becomes out of the concave portion.

Figure 13:
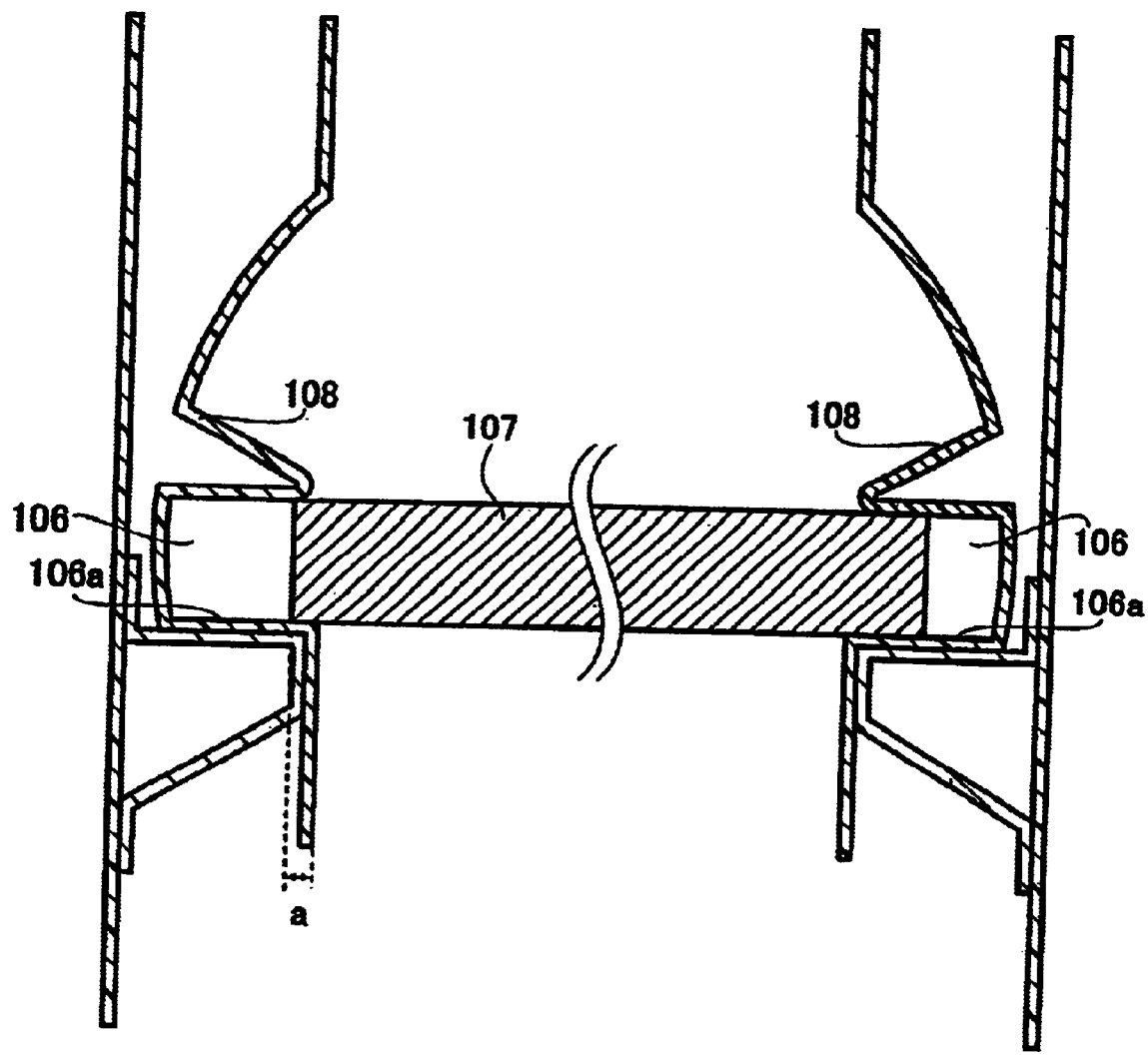
FIG. 13 is a sectional view of a conventional cargo bed as seen from the back side of the truck.

Further, since the scantling 7 is led onto the lower surface 6a of each concave portion 6 from the oblique and upper side, the scantling 7 is placed at a relatively outside position of the concave portion 6, so that a contacting area A (A=a×b) between the scantling 7 and the lower surface 6a of the concave portion 6 can be increased. Consequently, a load per a unit area applied to the bracket 9 supporting the lower surface 6a can be reduced. As a result, this situation allows the thickness of the bracket 9 to be thinner, thereby causing a reduction of the truck manufacturing cost and lightweight thereof. On the other hand, as shown in FIG. 13, the prior art had problems that the contacting area A between a scantling 107 and a lower surface 106a of a concave portion 106 becomes small when pressing the scantling 107 into another concave portion 106, thereby causing the conventional bracket to be thicker and more strengthened differently from one of the present invention. Here, as the cause, it should be noted in the prior art that a projection portion 108 formed integrally with a side surface of the concave portion 106 regulates the movement of the vertical direction of the scantling 107, and the prior art allows the scantling 107 to be mounted on the lower surface 106a through moving the scantling 107 in the substantially right and left direction. Therefore, the present invention has also solved such a problem of the prior art as the contacting area A can not be increased as shown in the prior art.

Also, since springs 8c are provided on each rotational member 8 to automatically rotate the rotational member 8 when the scantling 7 is mounted on the lower surface 6a, the scantling 7 can be easily installed, thereby relieving the task load of operator.

Although the horizontal flange portion 8b is provided at the other end of each rotational member 8 in the above mentioned embodiment, the movement of vertical direction of the scantling 7 may be regulated with the other end itself of the rotational member 8 without forming the horizontal flange portion 8b.

Figure 5:
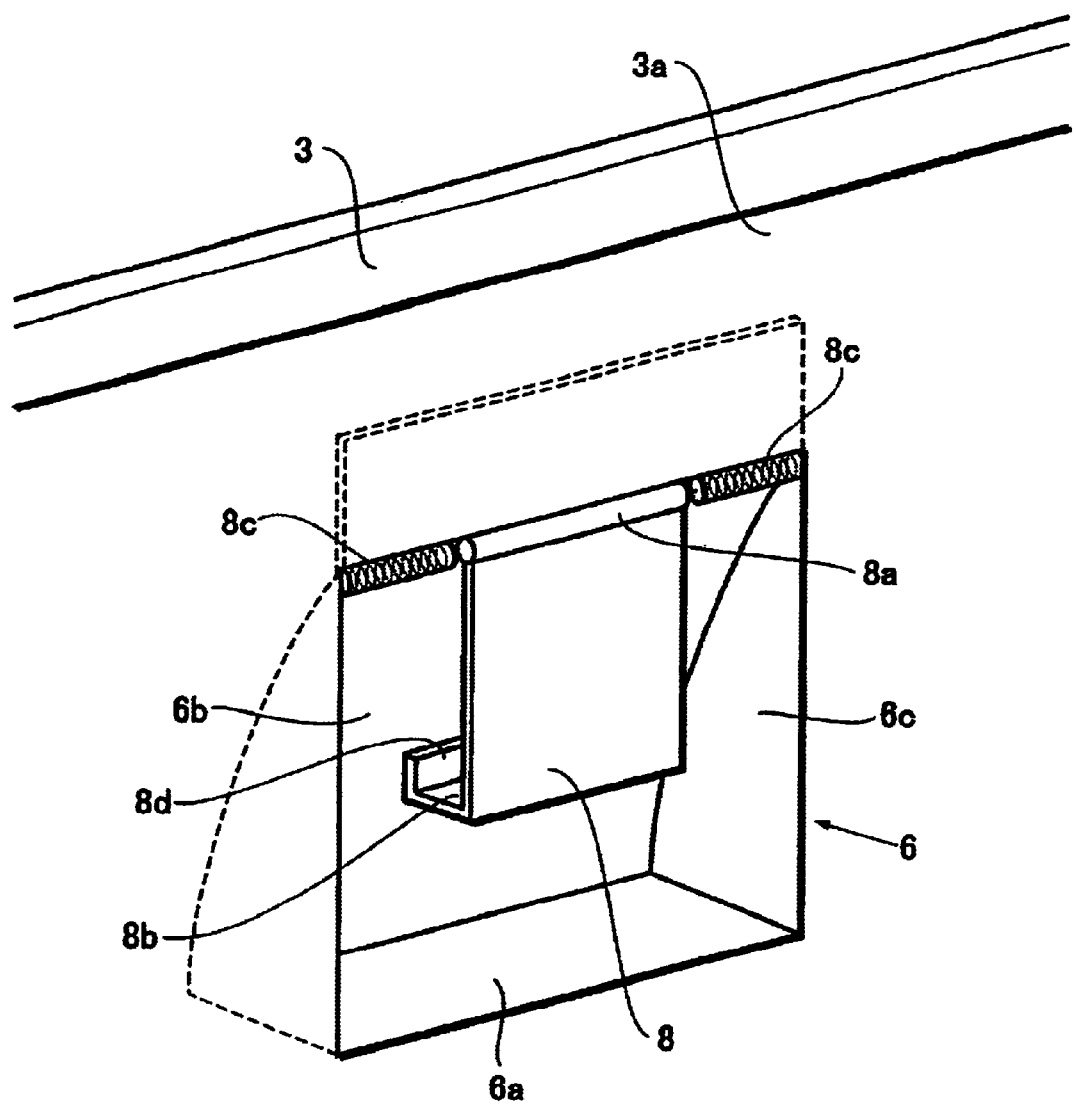
FIG. 5 is an enlarged perspective view of right and left side walls showing the second embodiment of the present invention.
Figure 6:
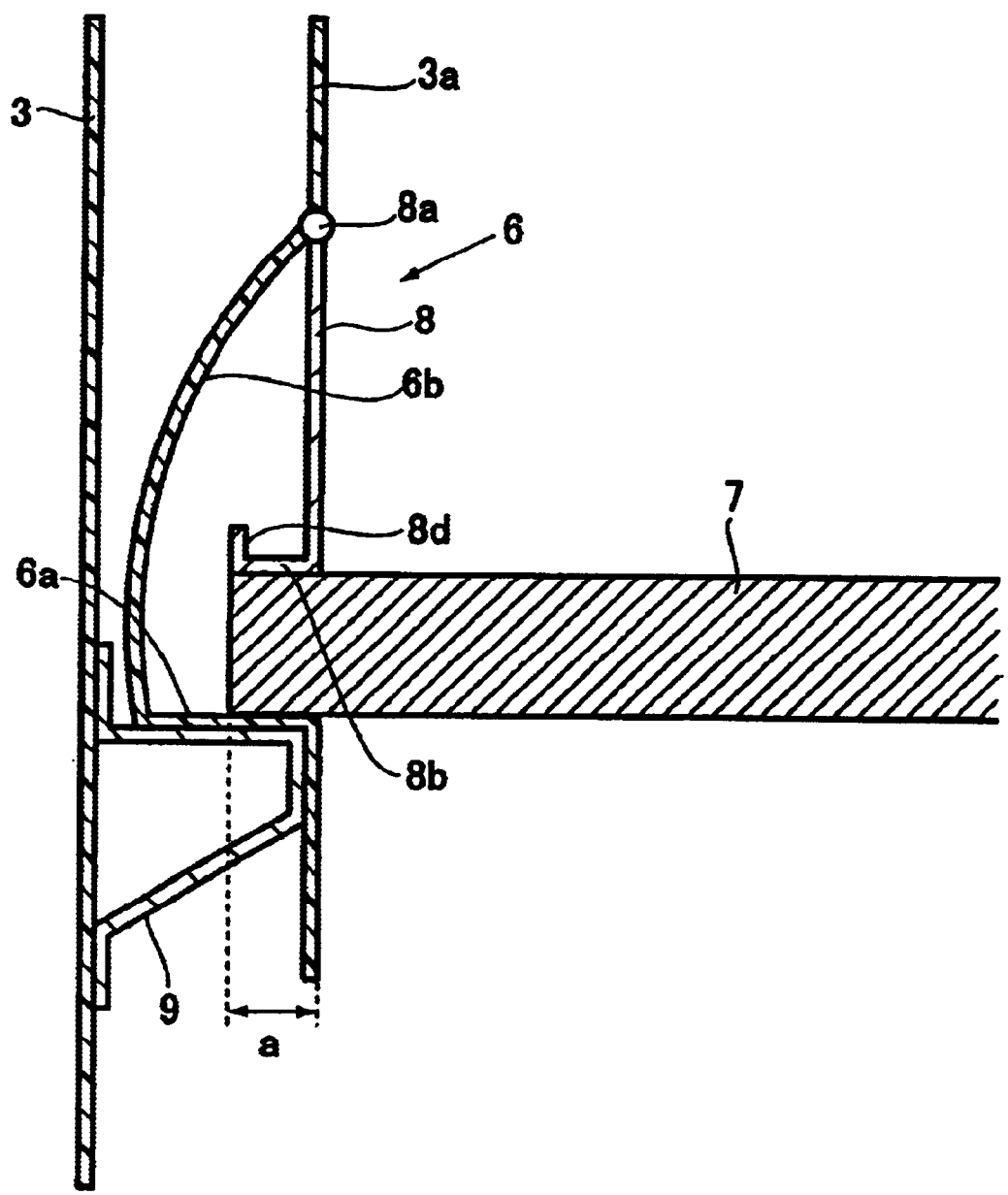
FIG. 6 is a partially sectional view of the cargo bed as seen from the back side of the truck showing the situation where an end of the scantling is installed into the concave portion formed in the side wall.

FIGS. 5 and 6 show the second embodiment of the present invention. FIG. 5 is an enlarged perspective view of the right and left side walls, and FIG. 6 is a partially sectional view of the cargo bed as seen from a back side of the truck showing the situation where an end of the scantling is installed into a concave portion formed in the side wall. As shown in FIGS. 5 and 6, the cargo bed structure of the second embodiment is provided with a hanging flange portion 8d on the above mentioned horizontal flange portion 8b, which extends upwardly from the open end of the flange portion 8b to work as a hanging member. Thus, when the scantling 7 is not mounted on the concave portion 6, on the hanging flange portion 8d can be hung articles such as the vinyl bag.

In such a way, according to the second embodiment, many kinds of articles can be hung with the hanging flange portion 8d on the bed 1, thereby resulting in an extremely convenient structure.

Figure 7:
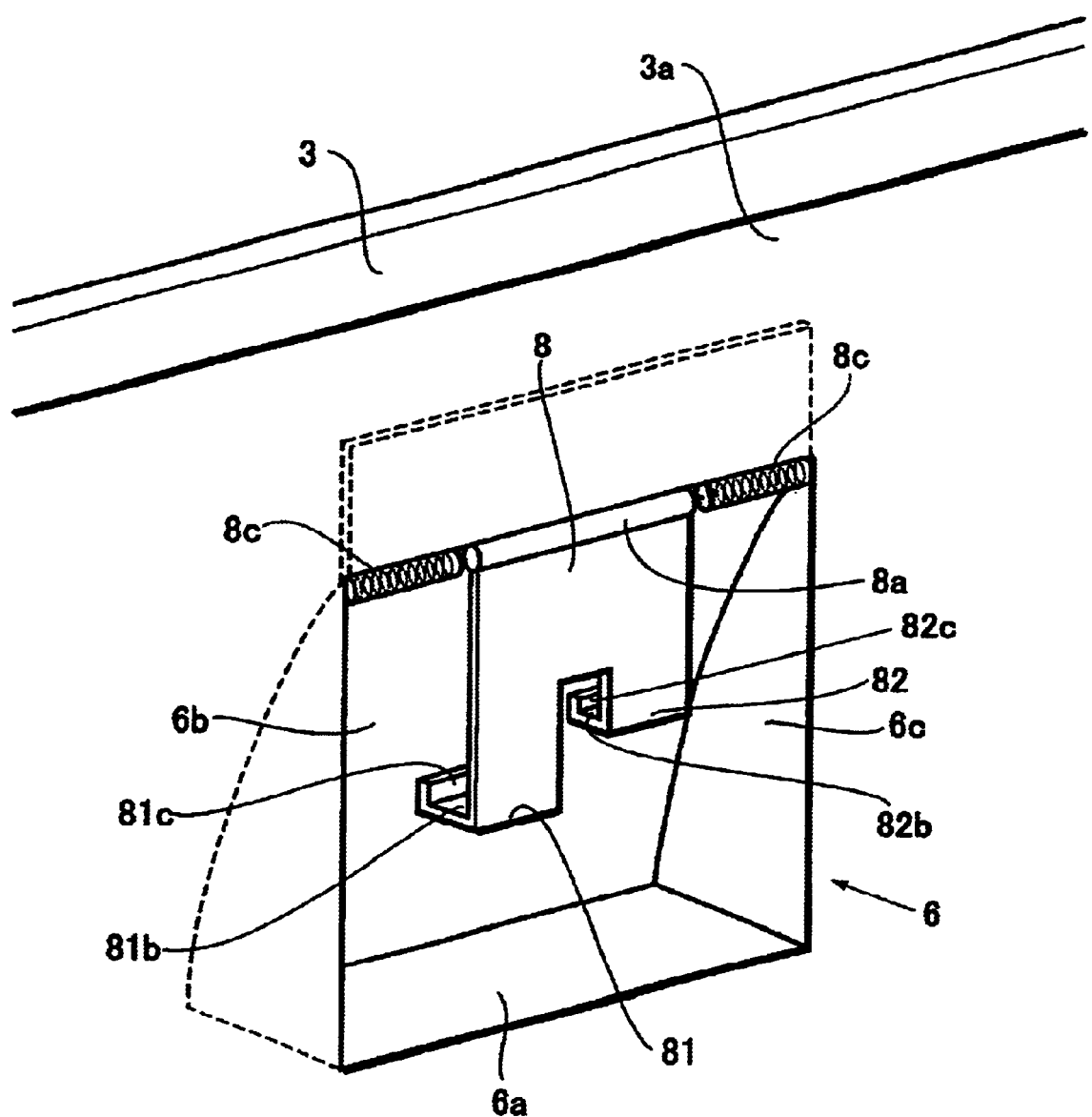
FIG. 7 is an enlarged perspective view of right and left side walls showing the third embodiment of the present invention.
Figure 8:
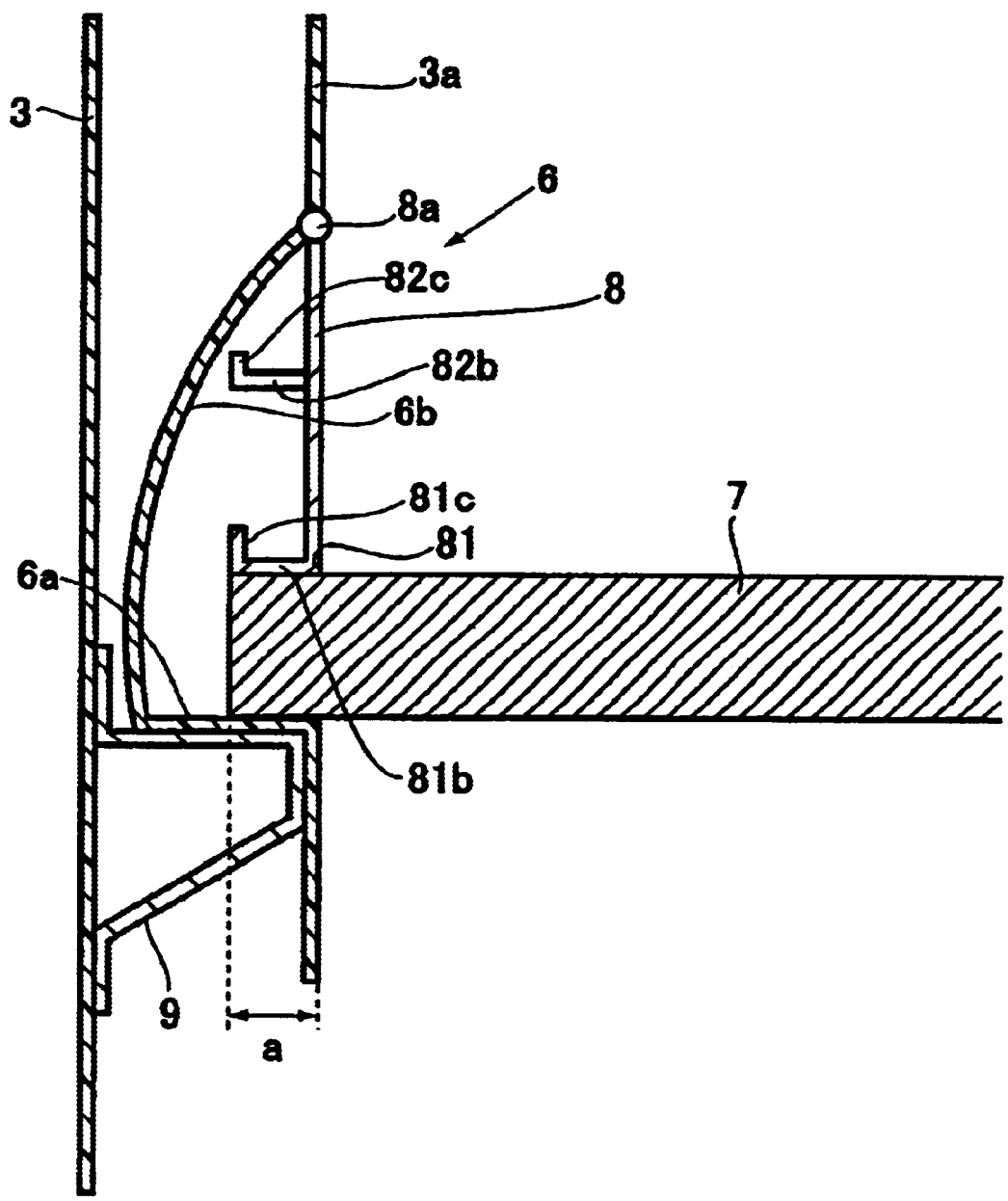
FIG. 8 is a partially sectional view of the cargo bed as seen from the back side of the truck showing the situation where an end of the scantling is installed into a concave portion formed in the side wall.

FIGS. 7 and 8 show the third embodiment of the present invention. FIG. 7 is an enlarged perspective view of the right and left side walls, and FIG. 8 is a partially sectional view of the cargo bed as seen from the back side of the truck showing the situation where an end of the scantling is installed into a concave portion formed in the side wall. As shown in FIG. 7, according to the bed structure of the third embodiment, the right and left portions of the other end of each rotational member 8 as mentioned above are formed unevenly, respectively.

The other end of each rotational portion 8 comprises a first other end portion 81 and a second other end portion 82 which is located at an upper position from the first other end portion 81. As well as the second embodiment, the first other end portion 81 includes a first horizontal flange portion 81b and a first hanging flange portion 81c, and the second other end portion 82 includes a second horizontal flange portion 82b and a second hanging flange portion 82c.

In the bed structure of the truck of the third embodiment, as shown in FIG. 8, when the first end portion 81 regulates the movement of the scantling 7 in the vertical direction, the hanging flange portion 82c can hold the articles such as a vinyl bag. In the situation where the scantling 7 is not installed in each concave portion 6, both hanging flange portions 81c and 82c can hold the articles such as a vinyl bag.

Thus, according to the third embodiment, even if the scantling 7 is installed in the concave portion 6 and fixed by the flange portion 81b attached with one of the hanging flange portions, the articles such as vinyl bags can be held by another hanging flange portion, thereby increasing the convenience.

Figure 9:
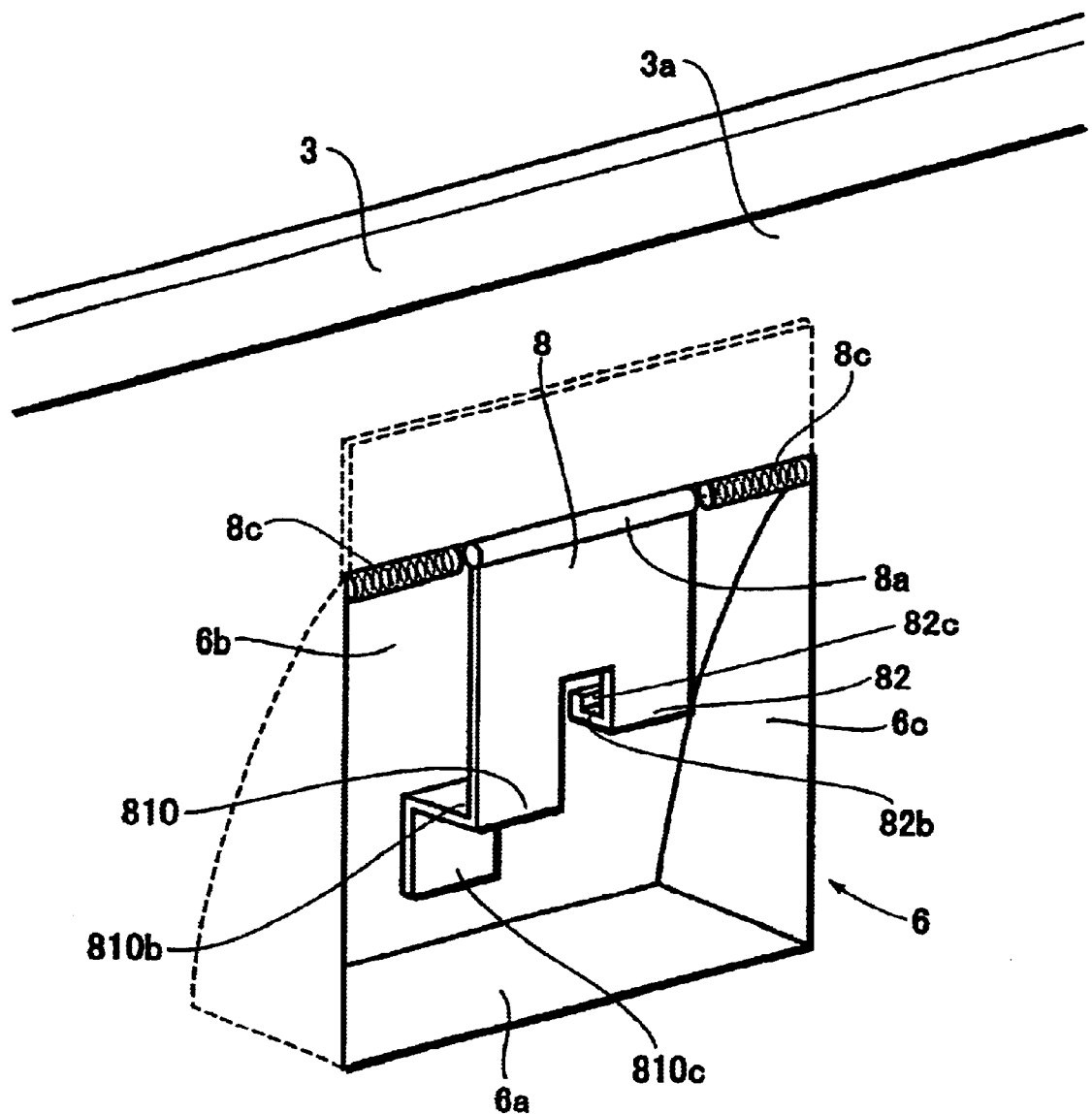
FIG. 9 is an enlarged perspective view of right and left side walls showing the fourth embodiment of the present invention.
Figure 10:
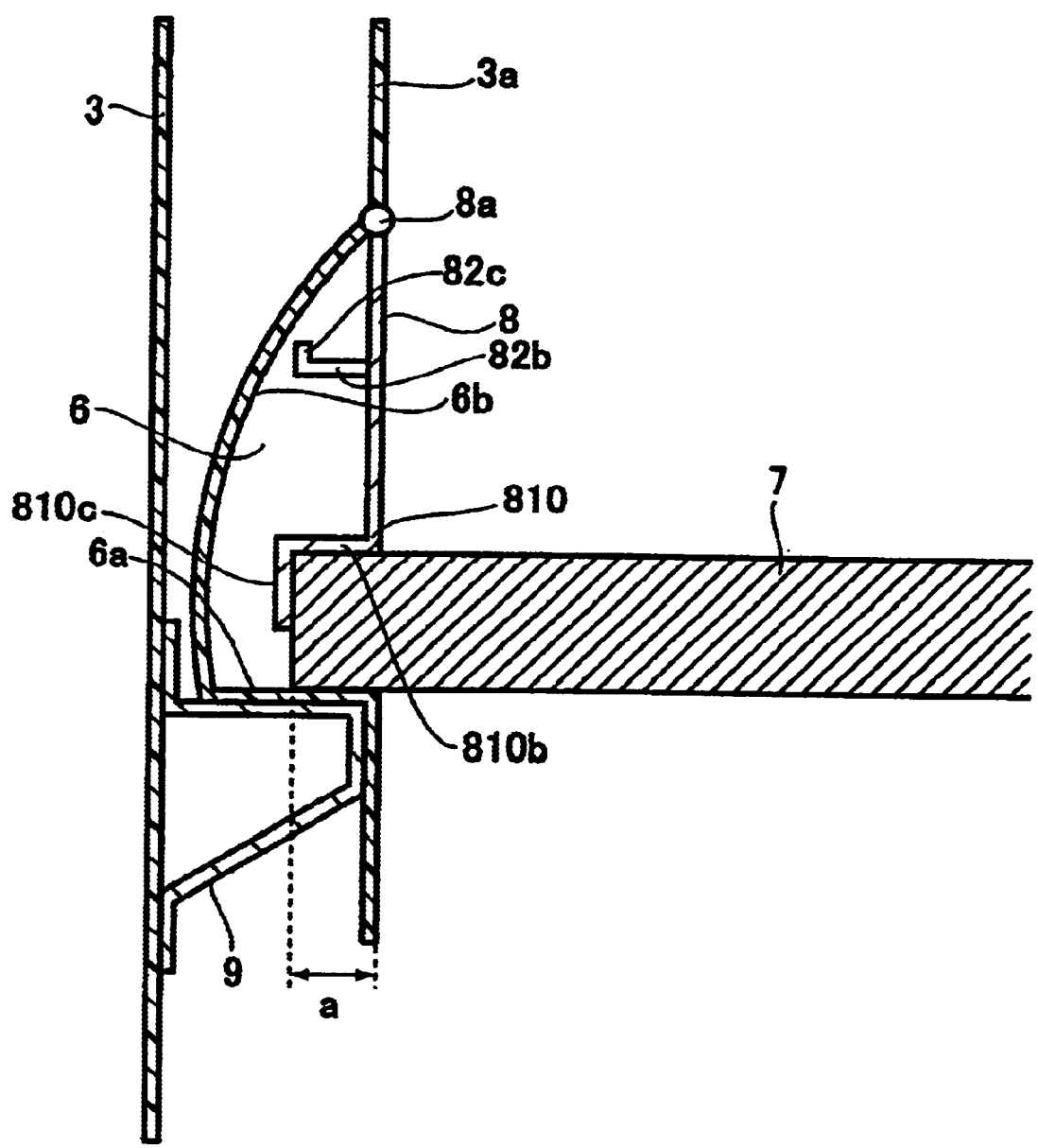
FIG. 10 is a partially sectional view of the cargo bed as seen from the back side of the truck showing the situation where an end of the scantling is installed into the concave portion formed in the side wall.

FIGS. 9 and 10 show the fourth embodiment of the present invention. FIG. 9 is a perspective view of the right and left side walls, and FIG. 10 is a partially sectional view of the cargo bed as seen from the back side of the truck showing the situation where an end of the scantling is installed into the concave portion formed in the sidewall. As shown in FIG. 9, according to the bed structure of the fourth embodiment, a first other end portion 810 is provided, a shape of which is different from one of the third embodiment.

Specifically, under the situation that each rotational member 8 rotates inwardly, the first other end portion 810 includes a right and left regulating flange portion 810c for regulating the movement of scantling in the right and left direction which extends downwardly from the free end portion of the first horizontal flange portion 810b. As shown in FIG. 10, the regulating flange portion 810c abuts with respective right and left surfaces of the scantling 7 to regulate a movement of the scantling 7 in the right and left direction as well as a main body of each rotational member regulates the movement of the vertical direction thereof.

Thus, according to the fourth embodiment, not only the scantling 7 is installed in the concave portion, but also the movement of the right and left direction thereof is regulated, so that the scantling 7 can be more firmly set within the concave portion 6.

Incidentally, the right and left regulating flange portion 810c of the fourth embodiment may be formed on the rotational member of the first or second embodiment as shown in FIG. 2 or 5, respectively.

Figure 11:
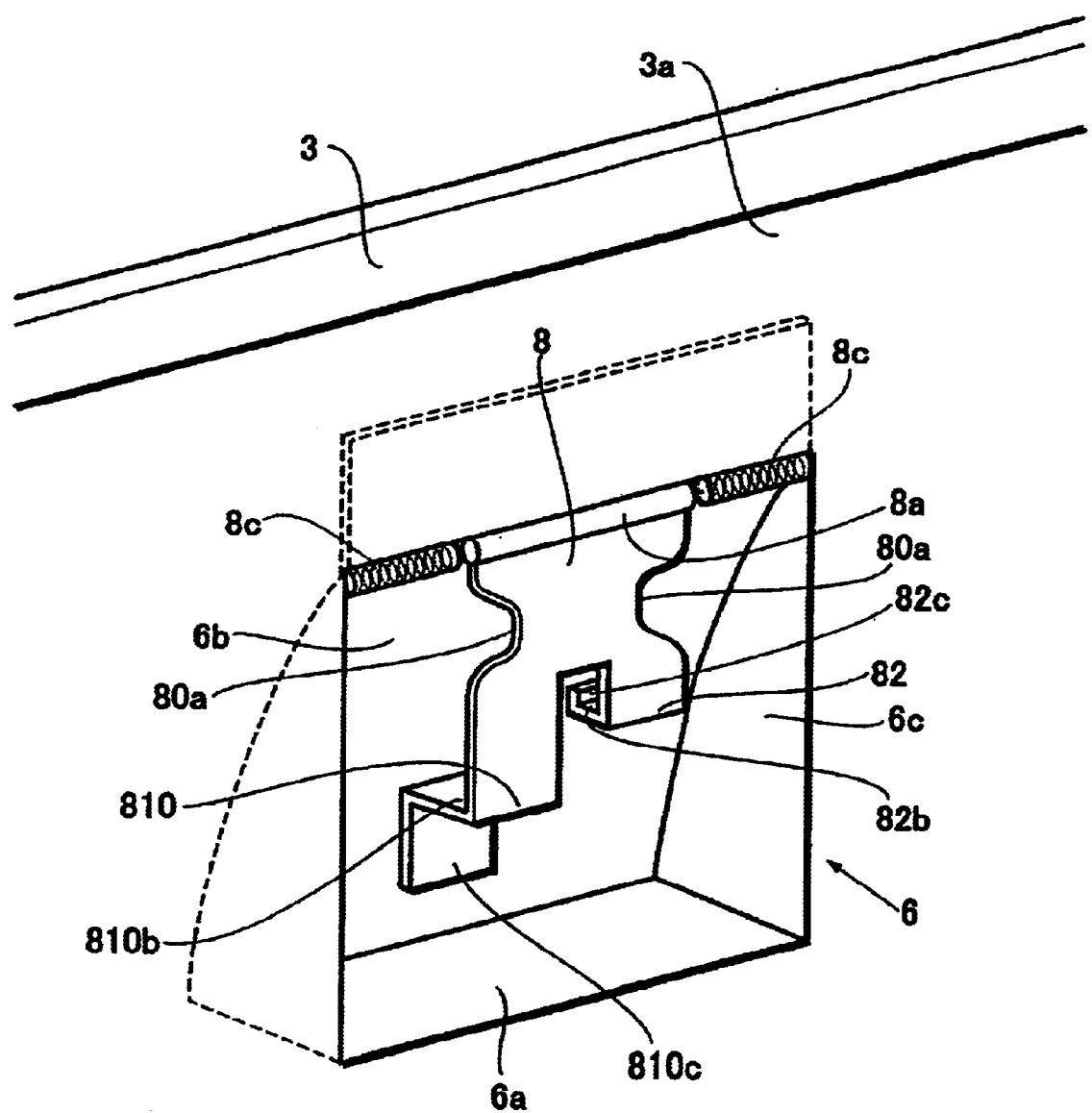
FIG. 11 is an enlarged perspective view of right and left side walls showing the fifth embodiment of the present invention.
Figure 12:
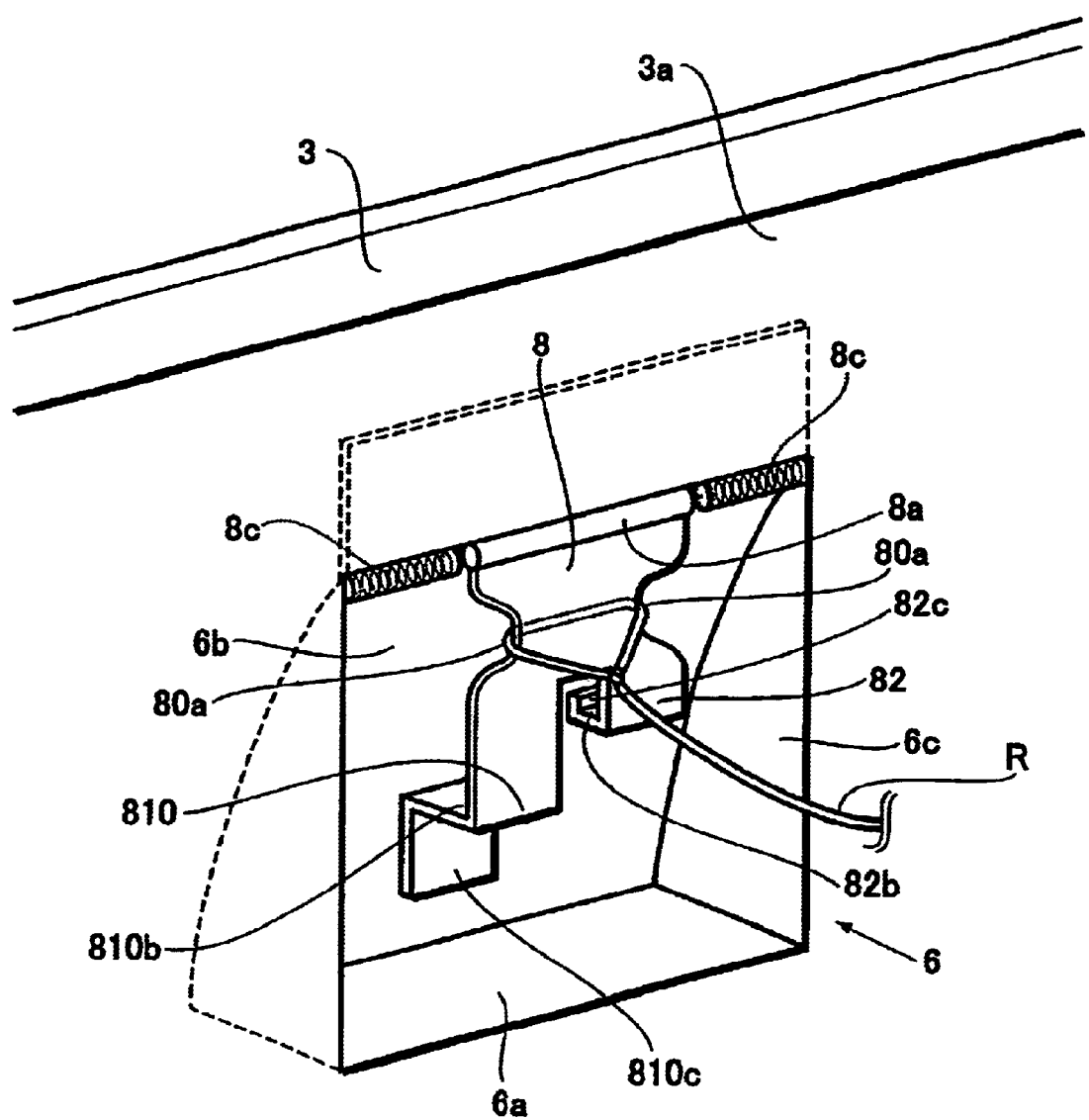
FIG. 12 is an enlarged perspective view of right and left side walls showing the situation where a string member is caught up at the rotational member.

FIGS. 11 and 12 show the fifth embodiment of the present invention. As shown in FIG. 11, according to the bed structure of the fifth embodiment, it is found that each rotational member 8 of the fourth embodiment is newly provided with a pair of notches 80a.

The pair of notches 80*a* are formed in a substantially horizontal direction between one end and the other end of each rotational member 8 and on the both sides of the main body thereof, thereby allowing a string member R such as a rope to be hung on each notch portion 80*a* as shown in FIG. 12. In such a way, the string member can be turned around a back of the rotational member 8, that is, the cargo mounted on the plate provided upon the scantling 7 can be firmly fixed by the rope, then being resulted in an improvement of the bed structure.

Moreover, instead of the notch 80*a* of the fifth embodiment, an eyelet may be formed on the rotational member so as to hang string members such as the rope.

Further, although the rotational member is formed like the plate in the embodiments as mentioned above, the other shape may be formed with.

Still further, although installed in the concave portion 6 is the scantling 7 in the embodiments as mentioned above, of course, another supporting member such as a pole can be used.

Also, the shape of the concave portion 6 can be freely changed so as to accomplish the object of the present invention.

While the invention has been described in conjunction with preferred specific embodiment thereof, it will be understood that these descriptions are intended to illustrate and not limit the scope of the invention, which is defined by the following claims.

What is claimed is:

1. A cargo bed structure of a truck having concave portions formed within an inside surface of each of right and left side walls of the truck for detachably mounting long materials on a lower surface of each of the concave portions, comprising:

a rotational member supported rotatably at an end thereof by a surface of the respective side wall formed over the respective concave portion, said rotational member regulating a movement of the long materials in a vertical direction with another end of said rotational member when said rotational member rotates in one direction, and deregulating the movement of the long materials when said rotational member rotates in an other direction.

2. The cargo bed structure according to claim 1, further comprising:

a forcing member provided at the end of said rotational member for forcing said rotational member is said one direction.

3. The cargo bed structure according to claim 1, further comprising:

a flange portion formed at the other end of each rotational member for firmly fixing the long materials in the concave portion.

4. The cargo bed structure according to claim 1, further comprising:

a hanging portion formed with a flange at the other end of said rotational member.

5. The cargo bed structure according to claim 4, wherein:

the other end of said each rotational member includes a first other end portion, and a second other end portion located at an upper position from the first other end portion, said first other end portion regulating the movement of the long materials in the vertical direction and said second other end portion being provided with said hanging portion.

6. The cargo bed structure according to claim 1, further comprising:

a right and left regulating portion provided at the other end of each said rotational member for regulating a movement of the long materials in a right and left direction when said rotational member rotates in one direction for regulating the movement of the long materials in the vertical direction.

7. The cargo bed structure according to claim 1, further comprising:

a pair of notches or eyelets formed between said one end and said other end of said rotational member.

* * * * *